(12) United States Patent  (10) Patent No.: US 7,957,769 B2
Mochizuki et al.  (45) Date of Patent: Jun. 7, 2011

(54) ELECTRONIC DEVICE HAVING A SUPPORTING FRAME FOR A DISPLAY

(75) Inventors: Kenichi Mochizuki, Yokohama (JP); Hidehiro Yanagibashi, Yokohama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/376,266

(22) PCT Filed: Oct. 24, 2006

(86) PCT No.: PCT/JP2006/321183
§ 371 (c)(1),
(2), (4) Date: Feb. 3, 2009

(87) PCT Pub. No.: WO2008/050408
PCT Pub. Date: May 2, 2008

(65) Prior Publication Data
US 2009/0264160 A1  Oct. 22, 2009

(51) Int. Cl.
*H04M 1/00* (2006.01)
(52) U.S. Cl. .......... 455/566; 361/695; 307/150
(58) Field of Classification Search .......... 455/566; 307/150; 361/695
See application file for complete search history.

(56) References Cited

U.S. PATENT DOCUMENTS 4,670,664 A * 6/1987 Hara .............................. 307/150
5,251,096 A * 10/1993 Hosoi et al. ................... 361/695

FOREIGN PATENT DOCUMENTS

| JP | 2001-021869 A | 1/2001 |
| JP | 2002-296569 A | 10/2002 |
| JP | 2004-251938 A | 9/2004 |

* cited by examiner

*Primary Examiner* — William D Cumming
(74) *Attorney, Agent, or Firm* — Seed IP Law Group PLLC (57) ABSTRACT

An electronic device with a display device and a mobile phone wherein if a shock of falling or the like, is added to a housing, the shock is hard to transmit to an end face of the display device are provided.

For a shock acting on a housing 11 by falling or the like, since a projection portion 36 having a recess 36a is provided between an inner wall 31 of an accommodation portion 30 and a frame 33, the shock from the inner wall 31 is relieved or absorbed by the projection portion 36, particularly, the recess 36a. Accordingly, if a shock of falling or the like, is added to the housing 11, a display device 40 can be protected from the shock.

14 Claims, 11 Drawing Sheets

ELECTRONIC DEVICE HAVING A SUPPORTING FRAME FOR A DISPLAY

TECHNICAL FIELD

This invention relates to an electronic device with display device such as a mobile phone and a mobile phone which includes a display device.

BACKGROUND ART

In an electronic device with a display device in a related art, to protect the display device, it is a common practice to hold the display device by a frame and accommodate the frame in an accommodation portion provided in a housing (for example, refer to patent document 1).
Patent document 1: JP-A-2002-296569

DISCLOSURE OF THE INVENTION

Problems to be Solved by the Invention

In a mobile phone as an electronic device with a display device, there have been proposed various measures against a shock added to the display device in the thickness direction. On the other hand, the slimming down of the display device has been attempted for slimming down of the entire of the mobile phone. As a result, there has been a problem that breakage of the display device could be caused by the shock on an end face of the display device when the mobile phone falls down.

The invention is embodied to solve the problem in the related art and it is an object of the invention to provide an electronic device with a display device and a mobile phone for preventing breakage of the display device if a shock of falling or the like, or an external pressing force occurs.

Means for Solving the Problems

An electronic device with a display device of the invention is characterized by a housing; a display device positioned in the housing; a frame for covering at least a part of an end face of the display device and supporting the display device; a projection portion provided on the housing side of the frame; and a recess provided between the projection portion and the frame.

In the invention, the shock acting on the housing by falling or the like, is transmitted to the inside of the housing as being through the frame to the display device since the frame covers at least a part of the display device and supports the display device.

At this time, since the recess is provided between the projection portion and the frame, the shock from the housing is relieved or absorbed as the projection portion is deformed so as to reduce the volume of the recess, and the shock transmitted to the frame is decreased. Accordingly, if a shock of falling or the like, is added to the housing, the display device can be protected from the shock.

The electronic device with the display device of the invention is characterized in that a connecting part of the projection portion and the frame is positioned on an extension of a bottom plate facing a rear on the opposite side to a display surface of the display device in the frame.

In the invention, the connecting part of the projection portion is positioned on the extension of the bottom plate of the frame, so that the shock transmitted to the frame is transmitted to the bottom plate through the deformed projection portion and is not transmitted to the end face of the display device.

Therefore, in the invention, breakage of the display device caused by the shock acting on the housing by falling or the like, can be prevented effectively.

Further, the electronic device with the display device of the invention is characterized in that a connecting part of the projection portion and the frame is positioned on an extension of a side plate facing a side end face of the display device in the frame.

In the invention, the connecting part of the projection portion is positioned on the extension of the side plate of the frame, so that the shock transmitted to the frame is transmitted to the side plate through the deformed projection portion and is not transmitted to the end face of the display device.

Therefore, in the invention, breakage of the display device caused by the shock acting on the housing by falling or the like, can be prevented effectively.

By the way, an electronic device with a display device such as a mobile phone has often a receiver placed above the display device oriented for the user to view display. When the housing falls down, the electronic device often falls down as the end part of the receiver side in the housing first.

At this time, the shock transmitted from the housing to the frame is easily transmitted to the upper end face of the display device oriented for the user to view display.

In contrast, the electronic device with the display device of the invention includes a receiver positioned in the housing, characterized in that the projection portion is positioned between the receiver and the display device.

Therefore, in the invention, the projection portion is positioned between the receiver and the display device, so that breakage of the display device caused by the shock acting on the housing by falling or the like, can be prevented effectively.

The electronic device with the display device of the invention includes a hinge part, characterized in that the projection portion is positioned between the hinge part and the display device.

In the invention, the projection portion is positioned between the hinge part and the display device, so that if the housing falls down as the hinge side first, breakage of the display device can be prevented effectively.

Further, the electronic device with the display device of the invention is characterized in that the projection portion is positioned in an end part in a shorter direction of the frame.

In the invention, the projection portion is positioned in the end part in the shorter direction of the frame, so that if the housing falls down as the side of the display device first, breakage of the display device can be prevented effectively.

An electronic device with a display device of the invention is characterized by a housing; a display device positioned in the housing; a frame for covering at least a part of an end face of the display device and supporting the display device; a projection portion provided on the frame side of the housing; and a recess provided between the projection portion and the housing.

In the invention, if a shock acts on the housing by falling or the like, the shock is relieved or absorbed by the projection portion provided on the frame side of the housing and the shock transmitted to the frame is decreased. Accordingly, if a shock of falling or the like, is added to the housings the display device can be protected from the shock.

The electronic device with the display device of the invention is characterized in that the recess is U-shaped.

The electronic device with the display device of the invention is characterized in that it is a mobile phone.

A mobile phone of the invention is characterized by a housing; a receiver positioned in the housing; a display device positioned in the housing; a frame for covering at least a part of an end face of the display device and supporting the display device; a projection portion provided on the housing side of the frame and positioned between the receiver and the display device; and a recess provided between the projection portion and the frame, characterized in that the projection portion is positioned in an opposite direction to a display surface from the display device.

Advantages of the Invention

According to the invention, even when a shock of falling or the like, or an external pressing force is applied to an electronic device with a display device, breakage of an internal liquid crystal display device can be prevented.

DESCRIPTION OF REFERENCE NUMERALS

10 Mobile phone (electronic device with display device)
11 Upper housing (housing)
16 Display device
30 Accommodation portion
31 Inner wall
33 Frame
34*b* Outer face of frame main body (outside of frame)
36 Projection portion
36*a* Space (recess)
36*b* Support part
36*c* Abutment part
40 Display device
40*a* End face
40*b* Back
41 Glass substrate

BEST MODE FOR CARRYING OUT THE INVENTION

First Embodiment

An electronic device with a display device of a first embodiment according to the invention will be discussed with the accompanying drawings.

Figure 1:
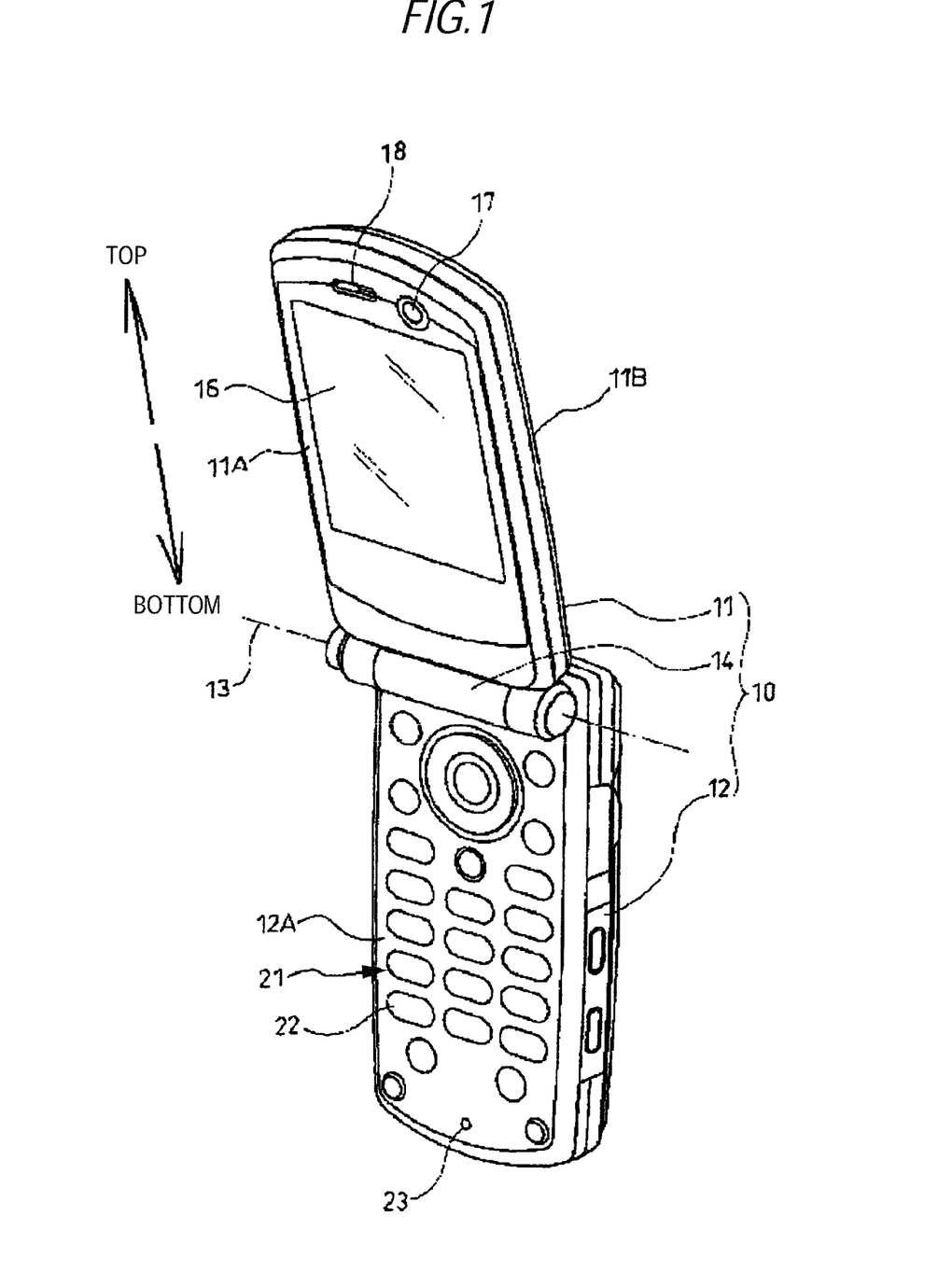
FIG. 1 is a perspective view of a mobile phone of an electronic device with a display device of a first embodiment according to the invention.
Figure 2:
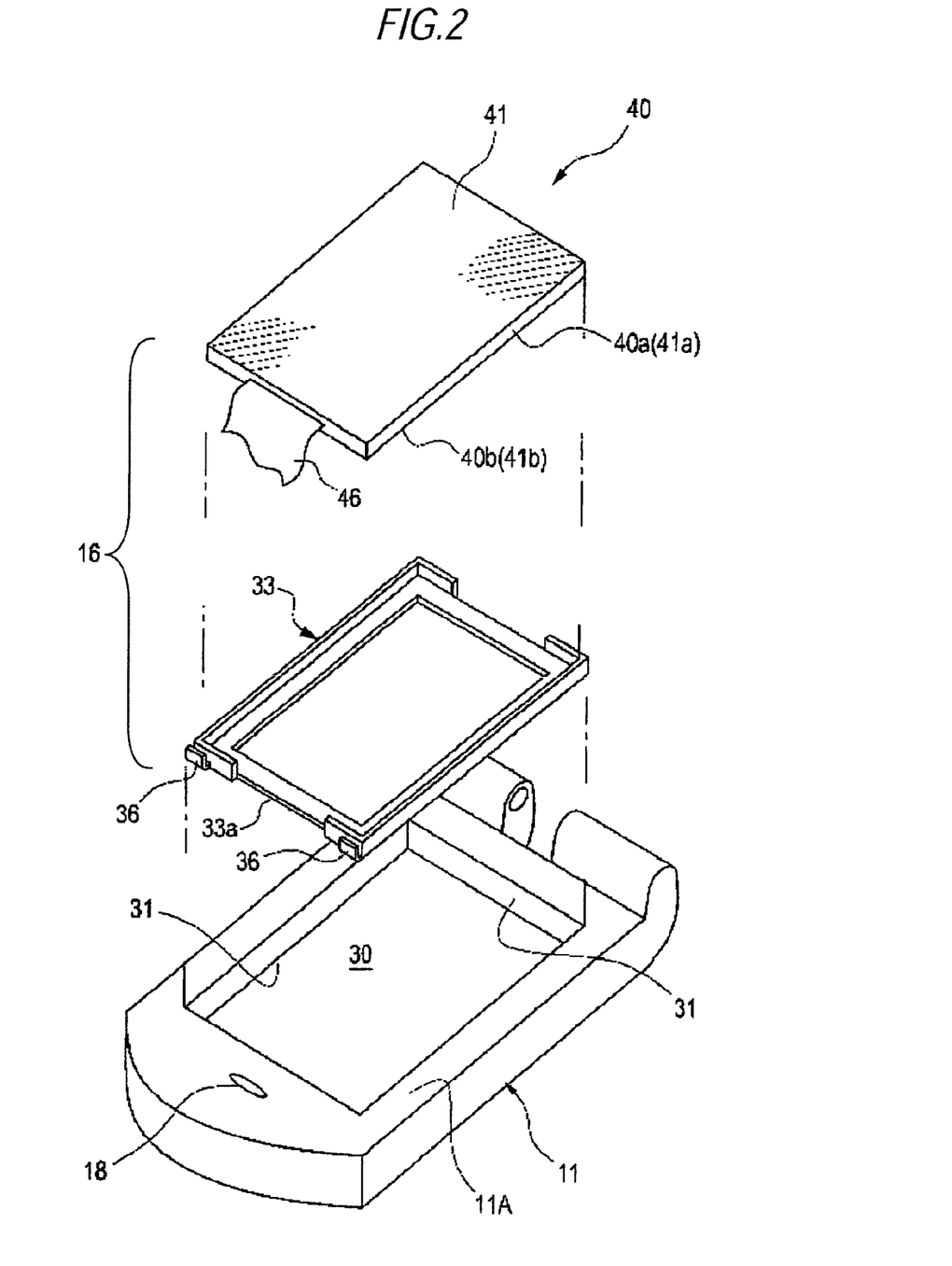
FIG. 2 is an exploded perspective view of an upper housing.
Figure 3:
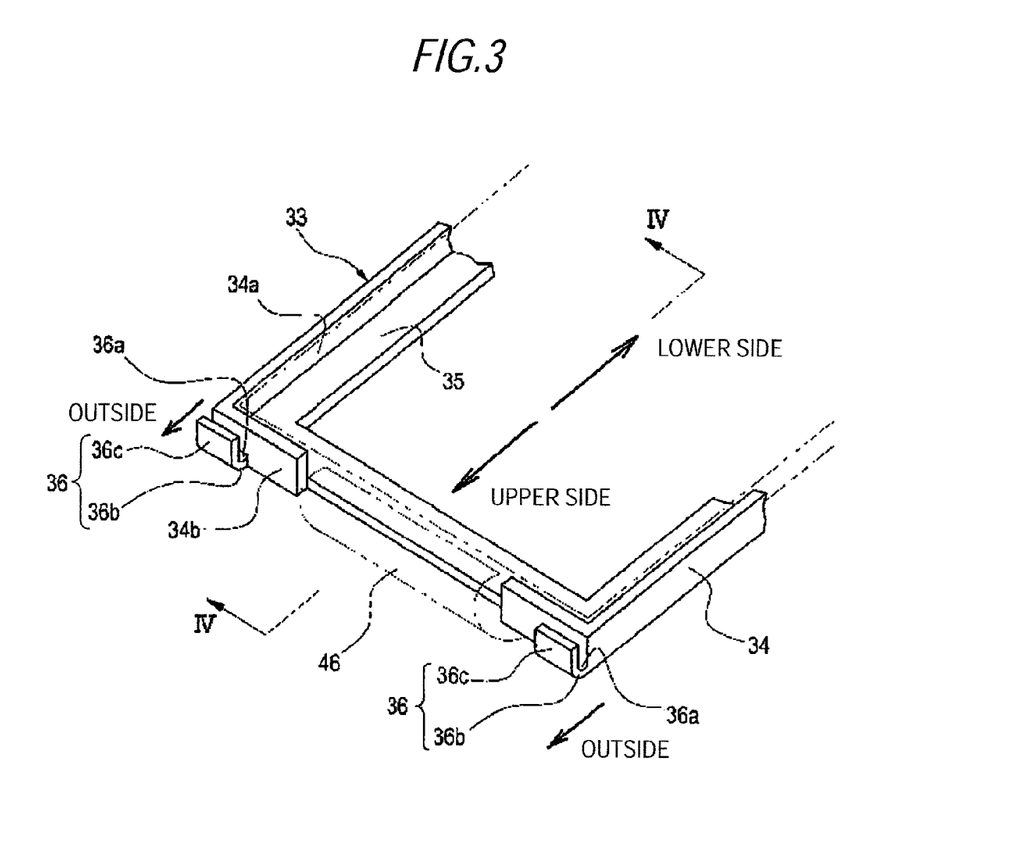
FIG. 3 is a perspective view of a frame.
Figure 4A:
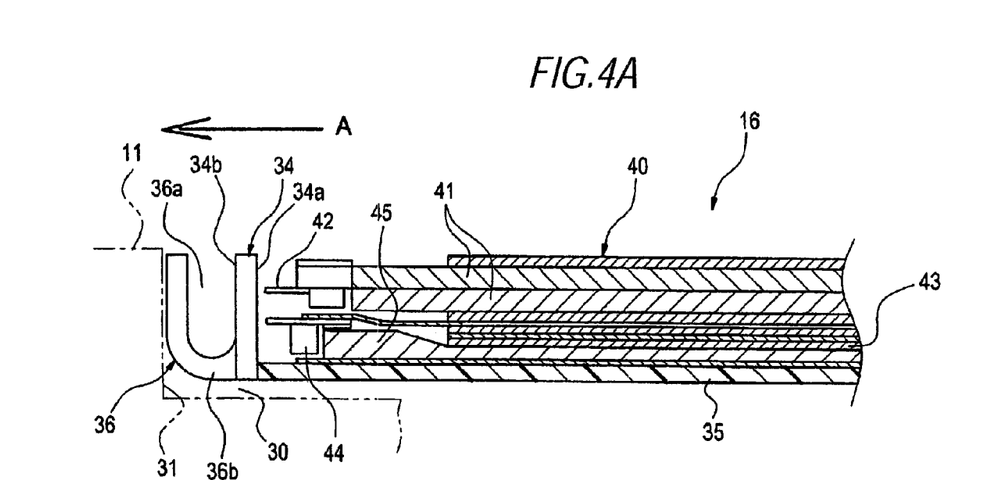
FIG. 4A is a sectional view of the frame and the display device taken on line IV-IV in FIG. 3.
Figure 4B:
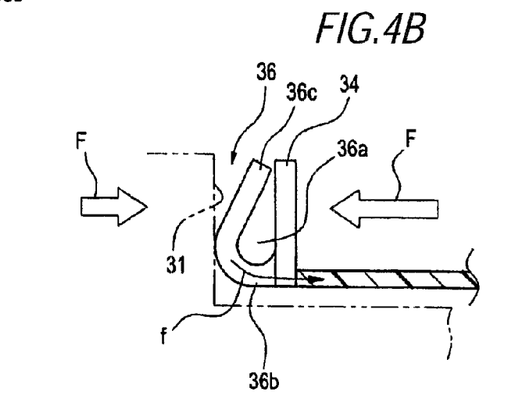
FIG. 4B is a sectional view to show deformation of the frame when a shock acts.

FIG. 1 is a perspective view of a mobile phone of the electronic device with a display device of the first embodiment according to the invention, FIG. 2 is an exploded perspective view of an upper housing, FIG. 3 is a perspective view of a frame, FIG. 4A is a sectional view of the frame and the display device taken on line IV-IV in FIG. 3, and FIG. 4B is a sectional view to show deformation of the frame when a shock acts.

As shown in FIG. 1, a mobile phone 10 of the electronic device with a display device of the first embodiment is a folding mobile phone including an upper housing 11, a lower housing 12, a joint portion 14 for joining the upper housing 11 and the lower housing 12 relatively pivotally with a pivot 13 placed along the boundary between the upper housing 11 and the lower housing 12 as the center, and a connection mechanism (not shown) of a circuit board accommodated in the upper housing 11 and the lower housing 12 for electrically connecting the components.

The upper housing 11 includes a display portion 16 substantially in the center of a surface 11A, includes a self side-imaging camera 17 and a receiver 18 above the display portion 16, and includes a forward side-imaging camera (not shown) on the back 11B. The lower housing 12 includes keys 22 of an operation portion 21 substantially in the center of a surface 12A and includes a microphone 23 below the operation portion 21. The joint portion 14 pivotally supports the lower end part of the upper housing 11 and the upper end part of the lower housing 12.

An accommodation portion 30 for accommodating a display device 40 shaped like a rectangular thin plate for forming the display portion 16 is provided as a recess inside the surface 11A side of the upper housing 11, as shown in FIG. 2. The accommodation portion 30 is surrounded on all sides by inner walls 31, so that a rectangular frame 33 with a size smaller than the accommodation portion 30 is accommodated in the accommodation portion 30.

Therefore, the display device 40 is attached to the inside of the frame 33 and accommodated in the accommodation portion 30 of the upper housing 11 and is a front display portion exposed to the outside when the upper housing 11 and the lower housing 12 are relatively pivoted and opened.

The display device 40 of the display portion 16 is a liquid crystal display device provided by stacking glass substrates 41 formed of glass (or resin) and a light guide plate 43, as shown in FIG. 4A. A liquid crystal portion (not shown) is interposed between the paired glass substrates 41 and a terminal 42 is drawn out to the outside from the liquid crystal portion. The light guide plate 43 is provided on an end face with a light guide portion 45 thickened substantially like a wedge in response to the shape and the dimensions of an LED 44 of a light source. The light guide portion 45 is placed so as to protrude toward the glass substrates 41 along the same plane relative to the lower face of the light guide plate 43. The terminal 42 is connected to a substrate (not shown in the figure) by a flexible cable 46.

The frame 33 is shaped like a rectangular frame as a whole and the cross section of each side is formed like an L-shape, of a frame main body 34 having an inner face 34a opposed to an end face 40a of the display device 40 and a support wall (bottom plate) 35 facing a back 40b on the opposite side to the display surface in the display device 40 for supporting, as shown in FIG. 3. Provided between the inner wall 31 of the accommodation portion 30 and an outer face 34b of the frame main body 34 facing the inner wall 31 is a projection portion 36 joined to the outer face 34b of an upper side 33a of the frame 33 of either of the inner wall 31 or the outer face 34b of the frame 33 and extending to the inner wall 31 of the accommodation portion 30 of the other. The projection portion 36 is formed almost like an L-shape in cross section, of a support part 36b extended away from the frame 33, namely, toward the outside (see the arrow in FIG. 3) so as to have a space 36a as a recess and an abutment part 36c joined to the support part 36b and provided substantially in parallel with the end face 40a of the display device 40.

As shown in FIG. 3, the projection portion 36 is provided in each of both left and right end parts on the outer face 34b on the upper side of the frame main body 34 (lower left side in FIG. 3; see the arrow in FIG. 3). The connecting part of the frame 33 and the projection portion 36, namely, the connecting part of the support part 36b of the projection portion 36 on the outer face 34b of the frame main body 34 is positioned on the extension of the support wall (bottom plate) 35 in the frame. The connecting part may be provided in the arrow A direction (shown in FIG. 4A) from the display device 40 so as not to transmit a force to the display device 40 at the time of a shock of falling or the like, described later.

The projection portions 36 are molded integrally with the frame and are positioned between the receiver 18 and the display device 40.

Thus, if shock F acts from the housing 11 and the frame 33 comes into collision with the inner wall 31 of the accommodation portion 30, the abutment part 36a and the support part 36b of the projection portion 36 become deformed, thereby relieving or absorbing the shock, as shown in FIG. 4B. At this time, force f transmitted through the support part 36b of the projection portion 36 into the frame 33 is further transmitted into the support wall 35 of the frame 33, so that the shock received by the projection portion 36 is not directly transmitted to the glass substrate 41 through the frame 33. Accordingly, the shock transmitted from the connecting part is dispersed in the support wall 35 and the shock transmitted to the glass substrate 41 becomes small.

According to the mobile phone 10 of the electronic device with a display device described above, the shock acting on the upper housing 11 by falling or the like, is relieved or absorbed by the projection portion 36 having the space 36a, so that the display device 40 can be protected from the shock.

Particularly, according to the mobile phone 10, each projection portion 36 is positioned between the receiver 18 and the display device 40, so that if the housing falls down as the receiver 18 first, the display device 40 can be protected reliably.

Second Embodiment

Next, an electronic device with a display device of a second embodiment according to the invention will be discussed with the accompanying drawings. Parts common to those previously described in the first embodiment are denoted by the same reference numerals and will not be discussed again.

Figure 5A:
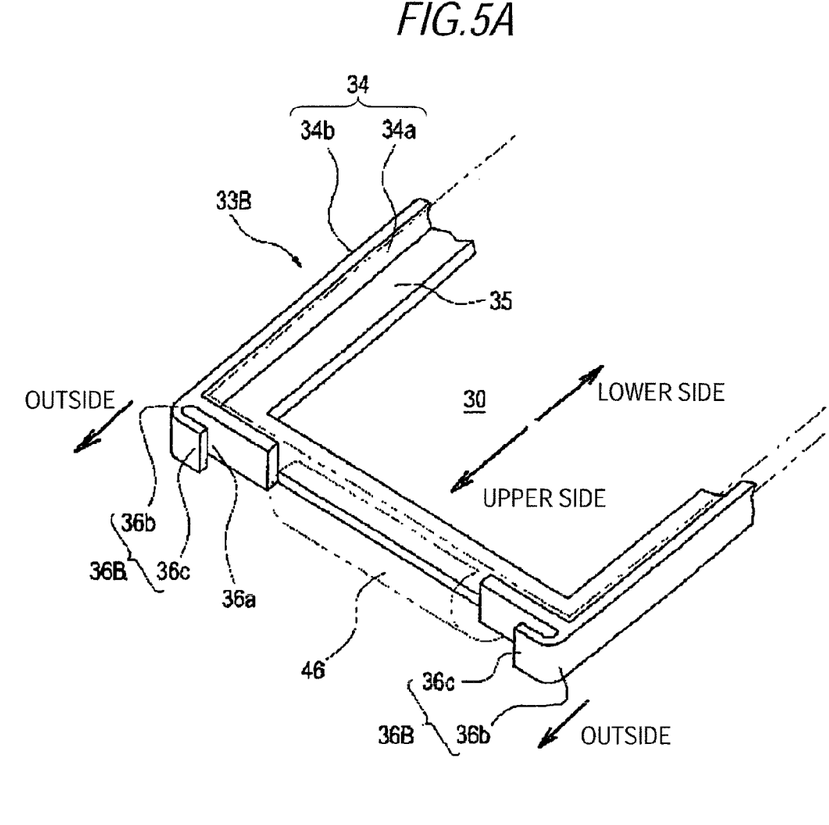
FIG. 5A is a perspective view of a frame used with a mobile phone of an electronic device with a unit of a second embodiment according to the invention.
Figure 5B:
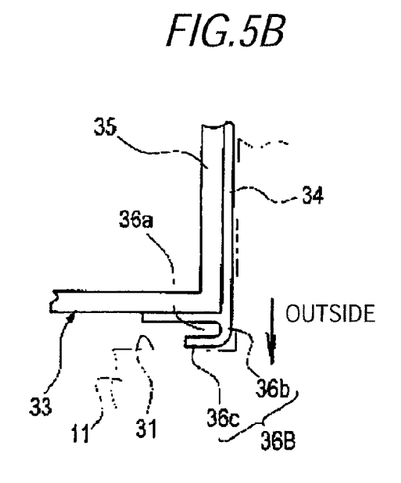
FIG. 5B is a plan view to show a projection portion before shock is received.
Figure 5C:
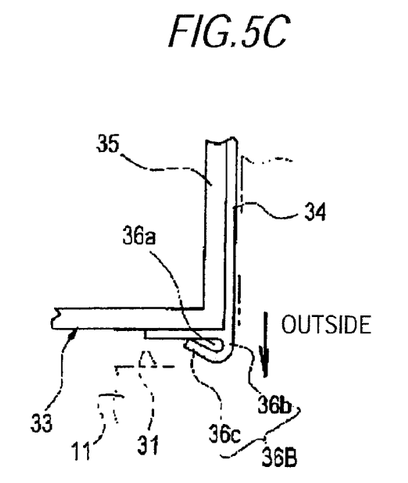
FIG. 5C is a plan view to show a projection portion after shock is received.

FIG. 5A is a perspective view of a frame used with a mobile phone of the electronic device with a display device of the second embodiment according to the invention, FIG. 5B is a plan view to show a projection portion before shock is received, and FIG. 5C is a plan view to show a projection portion after shock is received.

Provided between an inner wall 31 of an accommodation portion 30 and an outer face 34b of a frame main body 34 facing the inner wall 31 is a projection portion 36B joined to the outer face 34b of a frame 33B and extending to the inner wall 31 of the accommodation portion 30, as shown in FIGS. 5B and 5C. The projection portion 36B is formed almost like an L-shape in cross section, of a support part 36b extended away from the frame 33B, namely, toward the outside so as to have a space 36a as a recess and an abutment part 36c joined to the tip of the support part 36b and provided substantially in parallel with an end face 40a of a display device 40.

As shown in FIG. 5A, in the frame 33B, the projection portion 36B is provided in each of both left and right end parts on the outer face 34b on the upper side of the frame main body 34 (lower left side in FIG. 3). The connecting part of the frame 33B and the projection portion 36B, namely, the connecting part of the support part 36b of the projection portion 36B on the outer face 34b of the frame main body 34 is positioned on the extension of a side plate facing a side end face of the display device 40 in the frame 33B, as shown in FIG. 5A.

According to the mobile phone 10 described above, if an upper housing 11 receives a shock, the abutment part 36c of the projection portion 36 receives the shock and becomes deformed so as to decrease the volume of the space 36a of the recess for relieving or absorbing the shock. Further, the shock is transmitted from the support part 36b to the frame 33B, but the support part 36b is provided on the extension of the frame main body 34 of the frame 33B, so that the shock is not directly transmitted to the display device 40 accommodated in the frame main body 34 and the shock transmitted to the display device 40 can be decreased.

Also in the mobile phone 10, each projection portion 36B is positioned above the display device 40, so that if the housing falls down as the top of the display device 40 first, the display device 40 can be protected reliably.

Third Embodiment

Next, an electronic device with a display device of a third embodiment according to the invention will be discussed with the accompanying drawings. Parts common to those previously described in the first embodiment are denoted by the same reference numerals and will not be discussed again.

Figure 6:
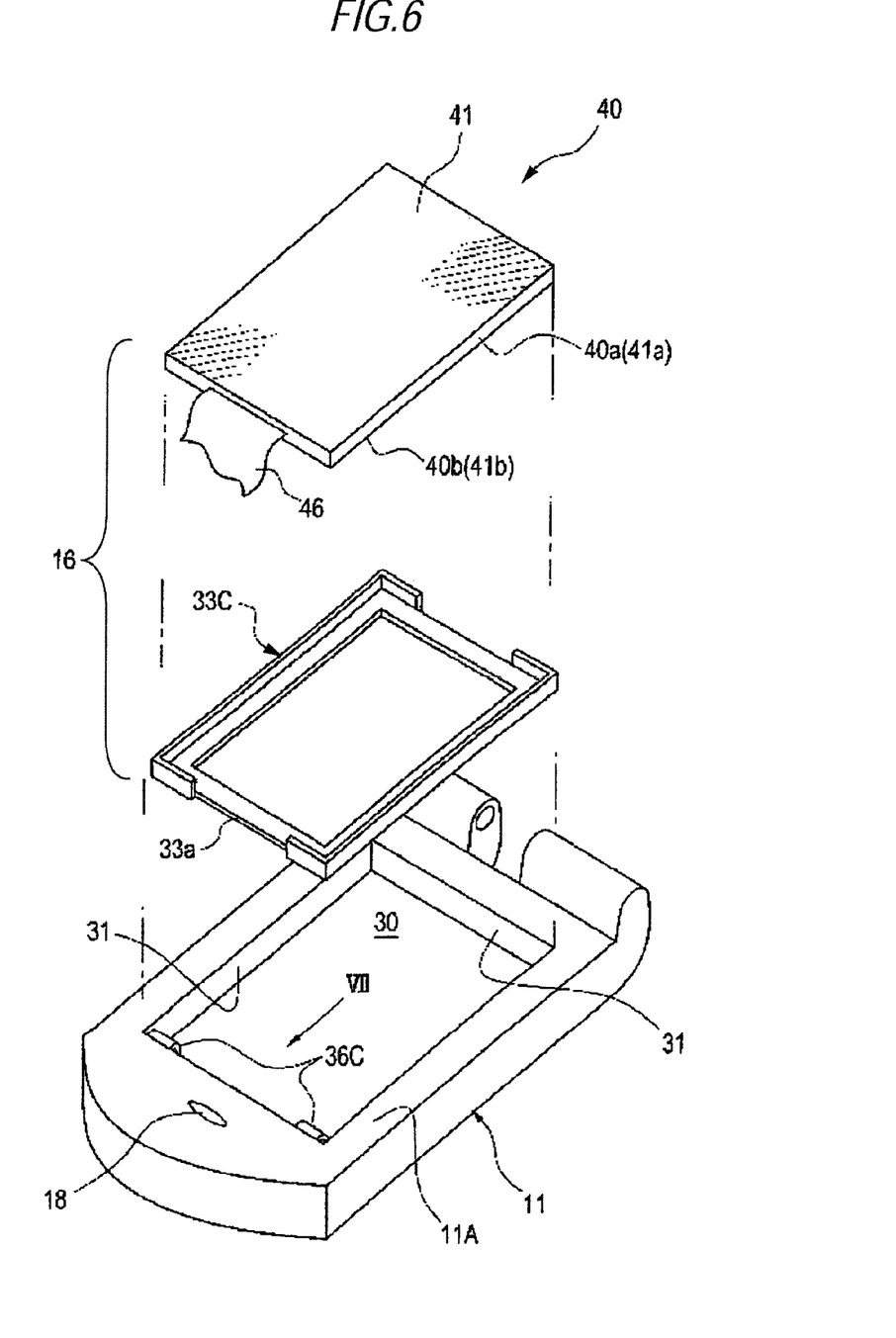
FIG. 6 is an exploded perspective view of an upper housing of an electronic device with a display device of a third embodiment.
Figure 7:
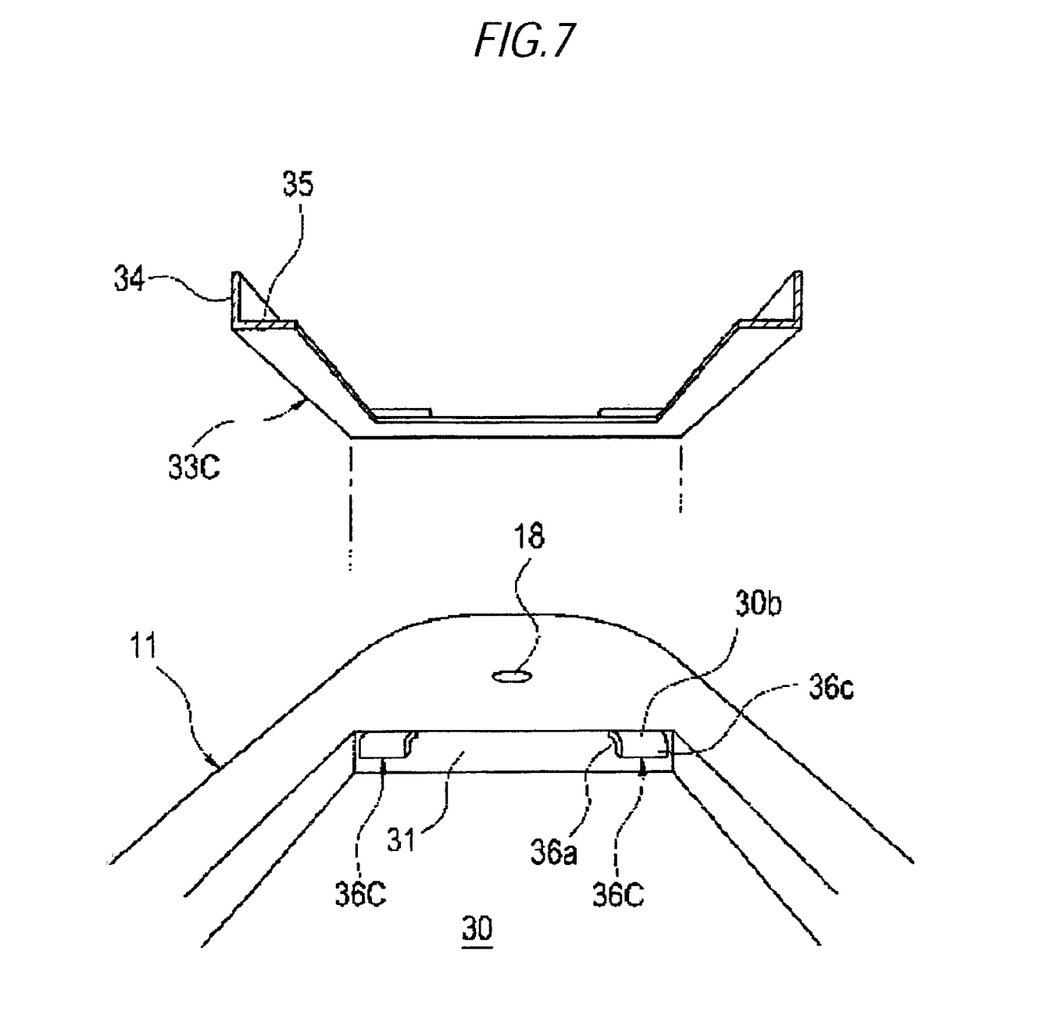
FIG. 7 is a perspective view of the inside of an accommodation portion of the upper housing viewed from VII direction in FIG. 6.

FIG. 6 is an exploded perspective view of an upper housing of a mobile phone of the electronic device with a display device of the third embodiment, and FIG. 7 is a perspective view of the inside of an accommodation portion of the upper housing viewed from VII direction in FIG. 7.

Provided between an inner wall 31 of an accommodation portion 30 and an outer face 34b of a frame main body 34C facing the inner wall 31 is a projection portion 36C joined to the inner wall 31 of either the inner wall 31 or the outer face 34b of a frame 33 and extending to the frame 33C of the other, as shown in FIGS. 6 and 7. The projection portion 36C is formed almost like an L-shape in cross section, of a support part 36b extended away from the inner wall 31, namely, toward the inside of the accommodation portion 30 so as to have a space 36a as a recess and an abutment part 36c joined to the support part 36b and provided substantially in parallel with an end face 40a of a display device 40 accommodated in the accommodation portion 30.

Therefore, in the third embodiment, the frame 33 is not provided with the projection portion 36C.

It is desirable that the connecting part of the projection portion 36C provided on the inner wall 31 of the accommodation portion 30 should be placed at a position where shock is not directly transmitted to the end face 40a of the display device 40 when the abutment part 36c of the projection portion 36C abuts the frame 33C. For example, it can be provided at a position corresponding to a support wall 35 of the frame 33C.

According to the mobile phone 10 described above, when the frame 33C of the accommodation portion 30 and the display device 40 move as a result of an upper housing 11 receiving shock and comes into collision with the inner wall 31 of the accommodation portion 30, the projection portion 36 provided on the inner wall 31 relieves or absorbs the shock, so that the shock acting on the display device 40 can be decreased and the display device 40 can be protected.

Also in the mobile phone 10, each projection portion 36 is positioned between a receiver 18 and the display device 40, so that if the housing falls down as the receiver 18 first, the display device 40 can be protected reliably.

Fourth Embodiment

Next, an electronic device with a display device of a fourth embodiment according to the invention will be discussed with the accompanying drawings. Parts common to those previously described in the first embodiment are denoted by the same reference numerals and will not be discussed again.

Figure 8:
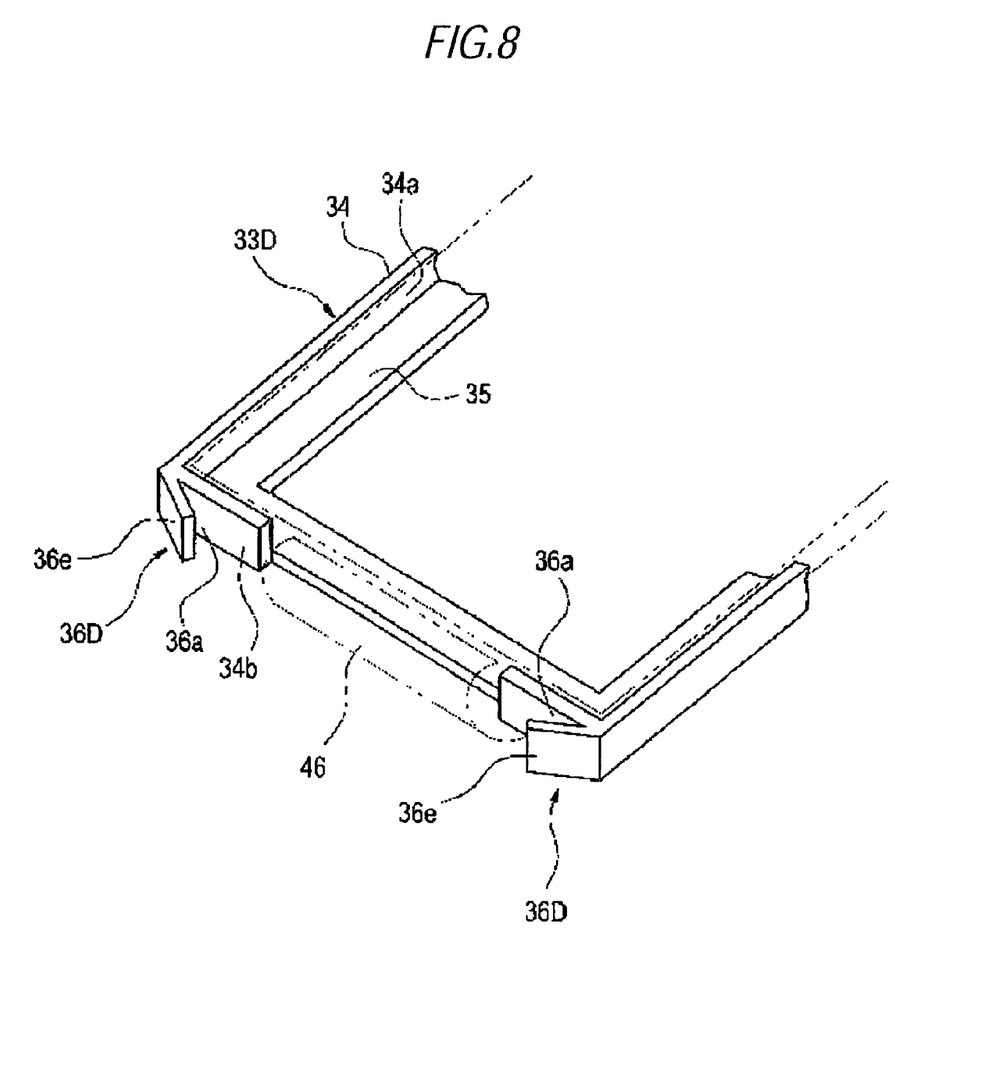
FIG. 8 is a perspective view of a frame used with a mobile phone of an electronic device with a display device of a fourth embodiment according to the invention.

FIG. 8 is a perspective view of a frame used with a mobile phone of the electronic device with a display device of the fourth embodiment according to the invention.

As shown in FIG. 8, in a frame 33D used with the mobile phone according to the embodiment, a projection portion 36D is provided on each of both left and right extensions of a frame main body 34 and is provided at a position not corresponding to the position of an end face 41 of a glass substrate 41 of a display device 40. The projection portion 36D is formed only of one member 36e serving both as the support part 36b and the abutment part 36c described above and projects to the inside in a slanting direction relative to an outer face 34b of a frame 33, thereby forming an internal space 36a of a recess.

The connecting part of each projection portion 36D is positioned on the extension of a side plate facing a side end face of the display device 40 in the frame 33D.

Such a structure is adopted, whereby the function and the effect similar to those of the embodiment described above are provided and the display device 40 can be protected. Further, the structure of the projection portion 36D can be a still more simplified.

Fifth Embodiment

Next, an electronic device with a display device of a fifth embodiment according to the invention will be discussed with the accompanying drawings. Parts common to those previously described are denoted by the same reference numerals and will not be discussed again.

Figure 9:
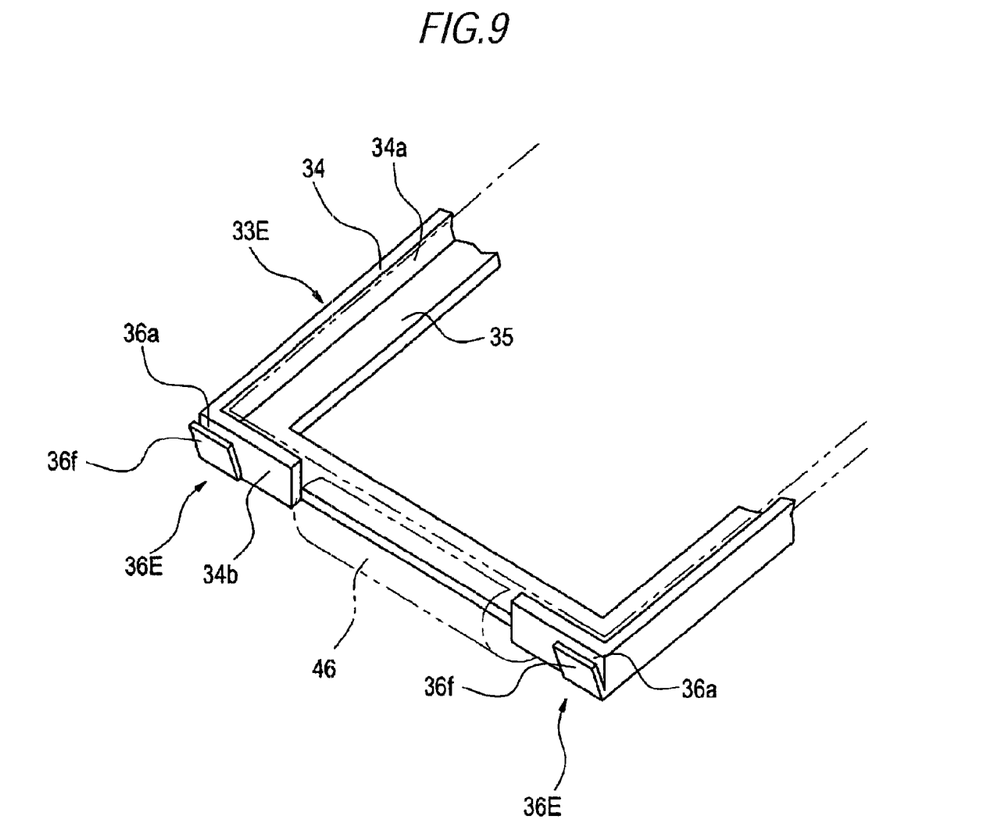
FIG. 9 is a perspective view of a frame used with a mobile phone of an electronic device with a display device of a fifth embodiment according to the invention.

FIG. 9 is a perspective view of a frame used with a mobile phone of the electronic device with a display device of the fifth embodiment according to the invention.

As shown in FIG. 9, in a frame 33E used with the mobile phone according to the embodiment, each projection portion 36D is provided on the extension of a support wall 35 and is provided at a position not corresponding to the position of an end face 41 of a glass substrate 41 of a display device 40. The projection portion 36E is formed only of one member 36f serving both as the support part 36b and the abutment part 36c described above and projects upward in a slanting direction relative to an outer face 34b of a frame 33, thereby forming an internal space 36a of a recess.

The connecting part of each projection portion 36D is positioned on the extension of the support wall (bottom plate) 35 in the frame 33E.

Such a structure is adopted, whereby the function and the effect similar to those of the embodiment described above are provided and the display device 40 can be protected. Further, the structure of the projection portion 36E can be a still more simplified.

Sixth Embodiment

Next, an electronic device with a display device of a sixth embodiment according to the invention will be discussed with the accompanying drawings. Parts common to those previously described are denoted by the same reference numerals and will not be discussed again.

Figure 10:
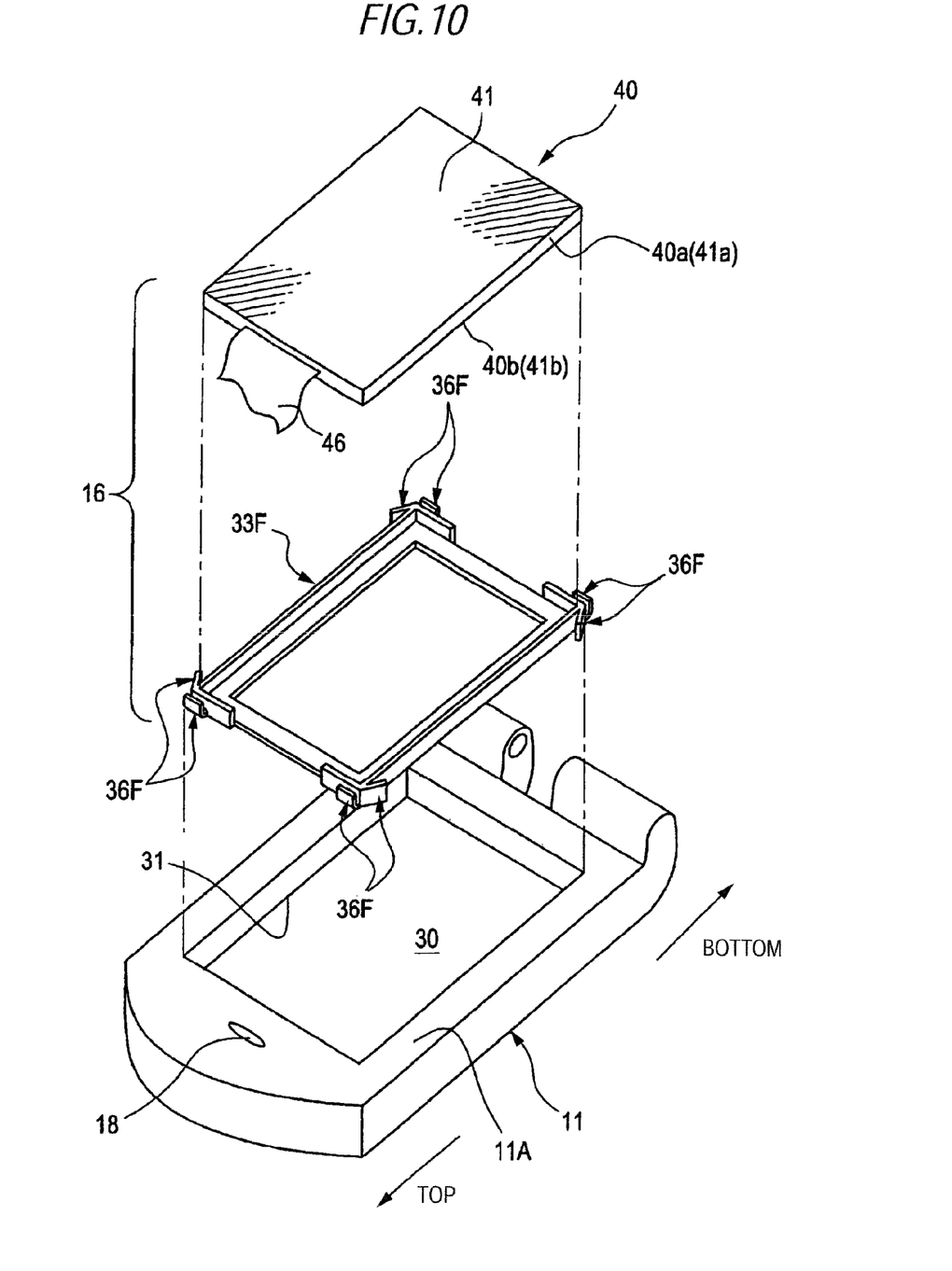
FIG. 10 is an exploded perspective view of an upper housing of an electronic device with a display device of a sixth embodiment according to the invention.

FIG. 10 is an exploded perspective view of an upper housing of the electronic device with a display device of the sixth embodiment according to the invention.

As shown in FIG. 10, in a frame 33F used with the mobile phone according to the embodiment, each projection portion 36F is provided on an outer face 34b in an up and down direction and from side to side in four corners of the frame 33F and is also provided in end parts in the shorter side direction of the frame 33F. Therefore, eight projection portions 36F are provided in total. The connecting part of each projection portion 36F is positioned on the extension of a side plate facing a side end face of a display device 40 in the frame 33F or on the extension of a support wall (bottom plate) 35 in the frame 33F.

Such a structure is adopted, whereby the function and the effect similar to those of the embodiment described above are provided and the display device 40 can be protected. Further, each projection portion 36F is provided in the up and down direction and from side to side in the four corners of the frame 33F, so that if the mobile phone 10 falls from any direction in the up and down direction or from side to side, the shock is absorbed and the display device 40 can be protected.

Figure 11:
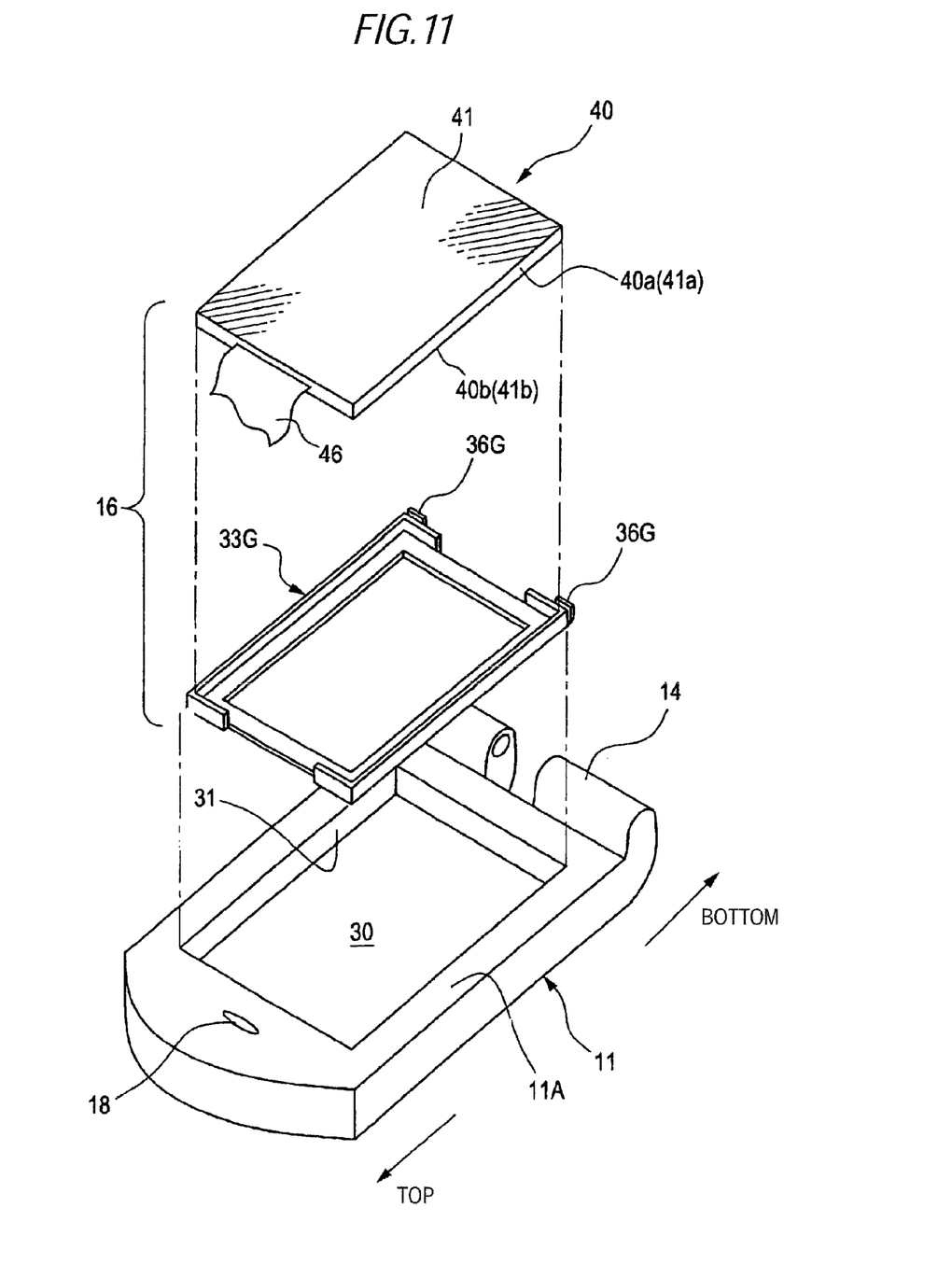
FIG. 11 is an exploded perspective view of an upper housing to show a modified example of a projection portion.

In the description given above, the case where the projections 36 are provided at least on the upper side of the frame 33 has been exemplified, but projections 36G can also be provided only between a hinge part 14 and a display device 40 as shown in FIG. 11.

In each embodiment described above, the folding mobile phone has been exemplified as the electronic device with a display device and the front display device exposed when the housing is opened has been exemplified as the display device. However, the invention can also be applied to a notebook personal computer, a portable music player, a portable TV, a portable radio, a camera, a liquid crystal watch, a liquid crystal stop watch, a portable GPS, a portable gaming device, a remote control for operating a stationary electronic device of a stereo, etc., and an electronic desk calculator and the form is not limited to the folding type, for example, may be a straight type, a slide type, a rotation type, etc., and the placement point of the display device and the number of display devices are also arbitrary.

Further, in each embodiment described above, the liquid crystal display device has been exemplified as the display device, but the invention can also be applied to an organic EL display device, an inorganic EL display device, etc., as a display device.

In each embodiment described above, the projection portion molded integrally with the frame has been exemplified, but the invention also contains a form in which a separate molded projection portion is later attached to a frame, for example.

Further, the shape of the recess in each embodiment described above may be a U-shape, an angular U-shape, or a V-shape, for example, in addition to the form shown in each embodiment described above.

The invention can also be embodied by combining the embodiments described above.

INDUSTRIAL APPLICABILITY

As described above, the electronic device with a liquid crystal display device according to the invention has the advantage that if a shock of falling or the like, is added to the housing, the display device can be protected from the shock, and thus the invention is useful for a mobile phone, a notebook personal computer, a portable music player, a portable TV, a PDA, and any other electronic device wherein a display device is supported by a frame in an accommodation portion of a housing.

The invention claimed is:

1. An electronic device with a display device, comprising:
a housing;
a display device positioned in said housing;
a frame for covering at least a part of an end face of said display device and supporting said display device;
a projection portion provided on a housing side of said frame; and
a space provided between said projection portion and said frame,
wherein a connecting part of said projection portion and said frame is positioned on an extension of a bottom plate facing a rear on the opposition side to a display surface of said display device in said frame.

2. An electronic device with a display device, comprising:
a housing;
a display device positioned in said housing;
a frame for covering at least a part of an end face of said display device and supporting said display device;
a projection portion provided on a housing side of said frame; and
a space provided between said projection portion and said frame,
wherein a connecting part of said projection portion and said frame is positioned on an extension of a side plate facing a side end face of said display device in said frame.

3. The electronic device with the display device as claimed in claim 1, further comprising a receiver positioned in said housing, wherein said projection portion is positioned between the receiver and said display device.

4. The electronic device with the display device as claimed in claim 1, further comprising a hinge part, wherein said projection portion is positioned between the hinge part and said display device.

5. The electronic device with the display device as claimed in claim 1, wherein said projection portion is positioned in an end part in a shorter direction of said frame.

6. An electronic device with the display device, as according to claim 1, wherein the electrical device is a mobile phone.

7. The electronic device with a display device as claimed in claim 2, further comprising a receiver positioned in said housing, wherein said projection portion is positioned between the receiver and said display device.

8. The electronic device with the display device as claimed in claim 2, further comprising a hinge part, wherein said projection portion is positioned between the hinge part and said display device.

9. The electronic device with the display device as claimed in claim 2, wherein said projection portion is positioned in an end part in a shorter direction of said frame.

10. An electronic device with a display device, as according to claim 2, wherein the electronic device is a mobile phone.

11. An electronic device with a display device, comprising:
a housing;
a display device positioned in said housing, said display device having a display surface;
a frame for covering at least a part of an end face of said display device and supporting said display device;
a projection portion provided on a housing side of said frame;
a connecting part interconnecting the projection portion with the frame;
a space provided between said projection portion and said frame,
wherein the connecting part is aligned with a bottom plate of the frame that faces a surface of the display device that is opposite the display surface.

12. The electronic device with the display device as claimed in claim 1, wherein said projection portion is capable of absorbing a shock acting on the housing.

13. The electronic device with the display device as claimed in claim 2 wherein said projection portion is capable of absorbing a shock acting on the housing.

14. The electronic device with the display device as claimed in claim 11 wherein said projection portion is capable of absorbing a shock acting on the housing.

* * * * *